(12) United States Patent  
Kawaguchi et al.

(10) Patent No.: US 9,229,587 B2  
(45) Date of Patent: Jan. 5, 2016

(54) CAPACITIVE TOUCHSCREEN SENSOR APPARATUS AND DISPLAY APPARATUS

(75) Inventors: Hiroto Kawaguchi, Miyagi (JP); Yutaka Wada, Miyagi (JP)

(73) Assignee: SONY CORPORATION, Tokyo (JP)

( * ) Notice: Subject to any disclaimer, the term of this patent is extended or adjusted under 35 U.S.C. 154(b) by 619 days.

(21) Appl. No.: 13/049,331

(22) Filed: Mar. 16, 2011

(65) Prior Publication Data

US 2011/0227866 A1    Sep. 22, 2011

(30) Foreign Application Priority Data

Mar. 19, 2010 (JP) ............................... P2010-063642

(51) Int. Cl.
*G06F 3/044* (2006.01)
*G06F 3/041* (2006.01)

(52) U.S. Cl.
CPC ............... *G06F 3/044* (2013.01); *G06F 3/041* (2013.01)

(58) Field of Classification Search
CPC .......... G06F 3/044; G06F 2203/04107; G06F 2203/04111; G06F 2203/04112
USPC .................................................. 345/173–178
See application file for complete search history.

(56) References Cited

U.S. PATENT DOCUMENTS

| | | | |
|---|---|---|---|
| 5,854,625 A | 12/1998 | Frisch et al. | |
| 2005/0280635 A1* | 12/2005 | Hinata | 345/173 |
| 2007/0146348 A1* | 6/2007 | Villain | 345/173 |
| 2007/0268265 A1* | 11/2007 | XiaoPing | 345/173 |
| 2008/0018611 A1* | 1/2008 | Serban et al. | 345/173 |
| 2008/0246741 A1* | 10/2008 | Hinata | 345/173 |
| 2008/0252608 A1* | 10/2008 | Geaghan | 345/173 |
| 2009/0058826 A1* | 3/2009 | Lee et al. | 345/173 |
| 2009/0140996 A1* | 6/2009 | Takashima et al. | 345/173 |
| 2009/0160817 A1* | 6/2009 | Wu et al. | 345/173 |
| 2010/0103116 A1* | 4/2010 | Leung et al. | 345/173 |
| 2011/0157069 A1* | 6/2011 | Zhuang et al. | 345/174 |
| 2011/0221680 A1* | 9/2011 | Karhiniemi et al. | 345/168 |

FOREIGN PATENT DOCUMENTS

| | | |
|---|---|---|
| JP | 10-198503 | 7/1998 |
| JP | 2000-347807 | 12/2000 |
| JP | 2009-134473 | 6/2009 |

OTHER PUBLICATIONS

Japanese Patent Office, Office Action issued in connection with Japanese Patent Application No. 2010-063642, dated Oct. 1, 2013. (3 pages).

* cited by examiner

*Primary Examiner* — Sanghyuk Park
(74) *Attorney, Agent, or Firm* — Hazuki International, LLC

(57) ABSTRACT

A sensor apparatus includes a first member, a second member, and a detection mechanism. The second member is relatively movable in a first direction with respect to the first member. The detection mechanism includes an elastic member arranged between the first member and the second member, a support that is provided between the first member and the elastic member and forms an air layer between the first member and the elastic member, the air layer having a thickness changed by an elastic deformation of the elastic member, and an electrode pair that forms a plurality of capacitances including a capacitance component changed in accordance with a change of the thickness of the air layer. The detection mechanism outputs a detection signal on a movement amount of the second member in the first direction based on a change of a combined capacitance of the electrode pair.

9 Claims, 12 Drawing Sheets

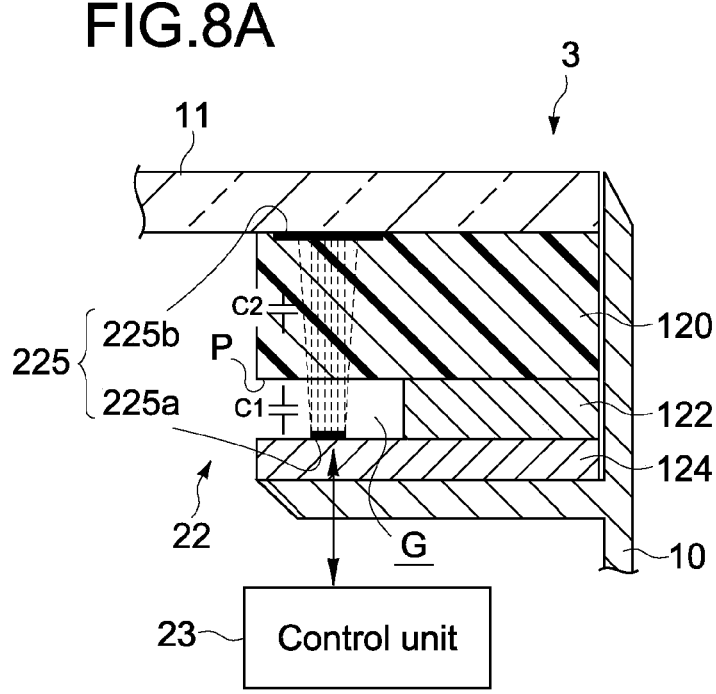
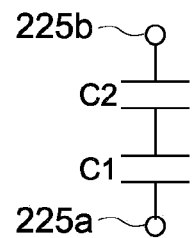
FIG.8A
FIG.8B
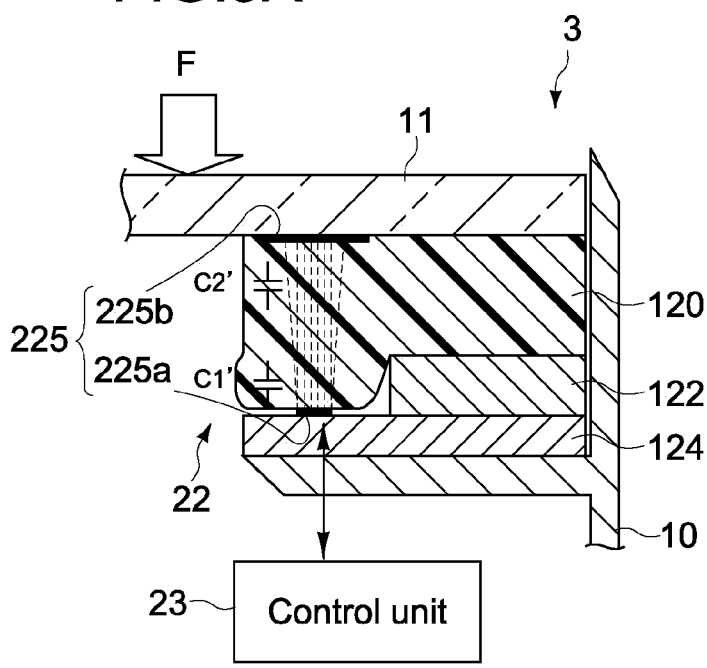
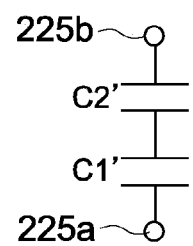
FIG.9A
FIG.9B

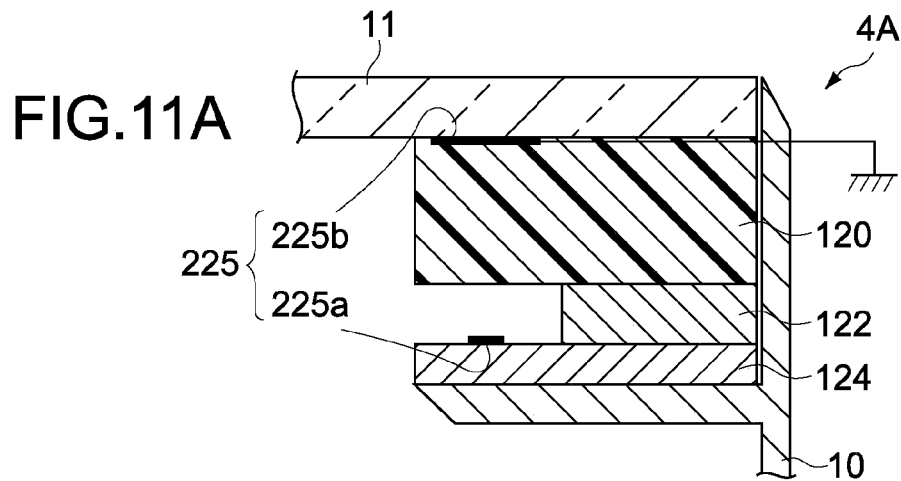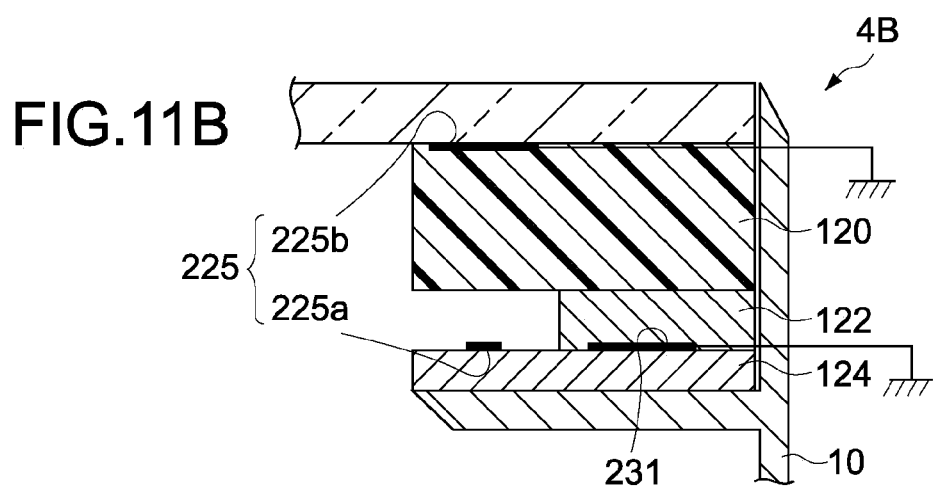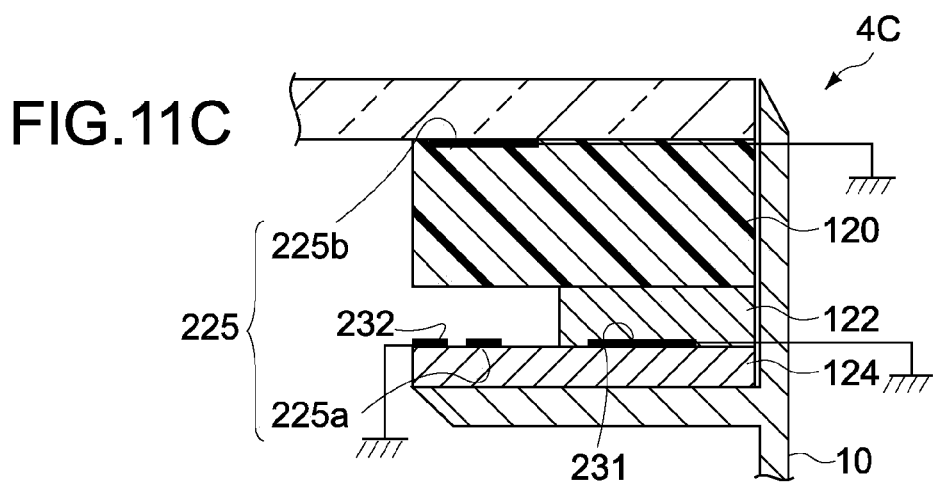

CAPACITIVE TOUCHSCREEN SENSOR APPARATUS AND DISPLAY APPARATUS

CROSS REFERENCES TO RELATED APPLICATIONS

The present application claims priority to Japanese Priority Patent Application JP 2010-063642 filed in the Japan Patent Office on Mar. 19, 2010, the entire content of which is hereby incorporated by reference.

BACKGROUND

The present application relates to a sensor apparatus for detecting, for example, a press operation made by a user, and to a display apparatus including the sensor apparatus.

In recent years, portable information processing apparatuses typified by cellular phones are being made multifunctional, and the structure in which a display unit provided to a casing is caused to function as a user interface is proposed. For example, Japanese Patent Application Laid-open No. 2009-134473 discloses an electronic apparatus including a touch panel for detecting an input operation position on a display unit, and a press detection sensor for detecting an input operation force as a change in electric resistance between electrodes. Further, Japanese Patent Application Laid-open No. Hei 10-198503 discloses a force detecting touch pad for detecting a press to a touch surface as a change in electric capacitance between electrodes.

Generally, a sensor for detecting a capacitance change due to a press adopts a technique of changing a capacitance between electrodes while using the structure in which a distance between electrodes is variable by a press. Since a capacitance is changed in inverse proportion to a distance between electrodes, in a case where a distance between electrodes is reduced by a press by 2%, for example, a capacitance between electrodes is increased by about 2%. On the other hand, in a case where a capacitance value of a capacitive sensor itself is difficult to be increased because of restrictions of a driver circuit, a detection speed, and the like, the sensor capacitance is restricted to about several pF to several tens of pF in many cases, though depending on a system of a detection circuit. Therefore, in a case where a change in distance between electrodes is minute, for example, about 2%, a capacitance change between electrodes is also minute and therefore it is extremely difficult to ensure detection sensitivity.

SUMMARY

As described above, in a sensor for detecting a capacitance change due to a press, it is difficult to obtain an excellent capacitance change due to a press under restrictions on capacitance in the detection system of the past that depends on a distance between electrodes to a large extent.

In view of the circumstances as described above, it is desirable to provide a sensor apparatus capable of obtaining an excellent capacitance change even if a change in distance between electrodes is minute, and a display apparatus including the sensor apparatus.

According to an embodiment, there is provided a sensor apparatus including a first member, a second member, and a detection mechanism.

The second member is relatively movable in a first direction with respect to the first member.

The detection mechanism includes an elastic member, a support, and an electrode pair. The elastic member is arranged between the first member and the second member. The support is provided between the first member and the elastic member and forms an air layer between the first member and the elastic member, the air layer having a thickness changed by an elastic deformation of the elastic member. The electrode pair forms a plurality of capacitances including a capacitance component changed in accordance with a change of the thickness of the air layer. The detection mechanism outputs a detection signal on a movement amount of the second member in the first direction based on a change of a combined capacitance of the electrode pair.

In the sensor apparatus, along with the relative movement of the second member with respect to the first member, the elastic member is elastically deformed and thus the thickness of the air layer formed between the first member and the elastic member is changed. On the other hand, the electrode pair forms the plurality of capacitances including a capacitance component changed in accordance with the change of the thickness of the air layer. The change of the thickness of the air layer corresponds to a change of a dielectric constant (specific dielectric constant) of a dielectric (air layer, elastic member, or mixture of air layer and elastic member) interposed by the electrode pair, and the capacitance component includes a change of a dielectric constant of the dielectric. Therefore, the detection mechanism outputs the change of the dielectric constant of the dielectric formed between the electrode pair as a detection signal on the movement amount of the second member with respect to the first member. According to the sensor apparatus described above, even in a case where a positional change of both the first and second members is minute, a large capacitance change can be generated, with the result that excellent detection sensitivity can be ensured.

The first member may include a dielectric layer formed to face the air layer, and the electrode pair may include a first electrode portion and a second electrode portion. The first electrode portion and the second electrode portion are arranged on the dielectric layer to face the air layer and are opposed to each other in a direction orthogonal to the first direction.

In this case, the electrode pair forms a first capacitance between the first electrode portion and the second electrode portion interposing the air layer, and a second capacitance between the first electrode portion and the second electrode portion interposing the dielectric layer. The detection mechanism outputs the detection signal based on a change of a combined capacitance of the first capacitance and the second capacitance.

The sensor apparatus may further include a third electrode portion that is connected to a ground potential. The third electrode portion is arranged on the second member to be opposed to the electrode pair in the first direction.

In the structure described above, the third electrode portion functions as a shield electrode. Accordingly, the capacitance change of the electrode pair by a conductor coming close to the detection mechanism can be suppressed, and the accuracy of outputting a detection signal by the detection mechanism can be improved.

Instead of the above example, the electrode pair may be structured as follows. Specifically, the first electrode portion is arranged on the first member to face the air layer. The second electrode portion is arranged on the second member to be opposed to the first electrode portion in the first direction.

In this case, the electrode pair forms a first capacitance between an interface of the air layer and the elastic member and the first electrode portion, and a second capacitance between the interface and the second electrode portion. The detection mechanism outputs the detection signal based on a change of a combined capacitance of the first capacitance and the second capacitance.

According to another embodiment, there is provided a sensor apparatus including a first member, a second member, and a detection mechanism.

The second member is relatively movable in a first direction with respect to the first member.

The detection mechanism includes an elastic member, a dielectric member, and an electrode pair. The elastic member is arranged between the first member and the second member. The dielectric member is arranged adjacently to the elastic member. The dielectric member changes a thickness of an air layer by an elastic deformation of the elastic member, the air layer being formed by the dielectric member being opposed to the first member in the first direction. The electrode pair forms a plurality of capacitances including a capacitance component changed in accordance with a change of the thickness of the air layer. The detection mechanism outputs a detection signal on a movement amount of the second member in the first direction based on a change of a combined capacitance of the electrode pair.

In the sensor apparatus, along with the relative movement of the second member with respect to the first member, the elastic member is elastically deformed and thus the thickness of the air layer formed between the first member and the dielectric member is changed. On the other hand, the electrode pair forms the plurality of capacitances including a capacitance component changed in accordance with the change of the thickness of the air layer. The change of the thickness of the air layer corresponds to a change of a dielectric constant (specific dielectric constant) of a dielectric (air layer, dielectric member, or mixture of air layer and dielectric member) interposed by the electrode pair, and the capacitance component includes a change of a dielectric constant of the dielectric. Therefore, the detection mechanism outputs the change of the dielectric constant of the dielectric formed between the electrode pair as a detection signal on the movement amount of the second member with respect to the first member. Therefore, according to the sensor apparatus, even in a case where a positional change of both the first and second members is minute, a large capacitance change can be generated, with the result that excellent detection sensitivity can be ensured.

According to another embodiment, there is provided a display apparatus including a first member, a second member, a detection mechanism, and a display device.

The first member has light-transmissive property.

The second member is relatively movable in a first direction with respect to the first member.

The detection mechanism includes an elastic member, a support, and an electrode pair. The elastic member is arranged between the first member and the second member. The support is provided between the first member and the elastic member and forms an air layer between the first member and the elastic member, the air layer having a thickness changed by an elastic deformation of the elastic member. The electrode pair forms a plurality of capacitances including a capacitance component changed in accordance with a change of the thickness of the air layer. The detection mechanism outputs a detection signal on a movement amount of the second member in the first direction based on a change of a combined capacitance of the electrode pair.

The display device is accommodated in the second member and has a display surface opposed to the first member.

According to another embodiment, there is provided a display apparatus including a first member, a second member, a detection mechanism, and a display device.

The first member has light-transmissive property.

The second member is relatively movable in a first direction with respect to the first member.

The detection mechanism includes an elastic member, a dielectric member, and an electrode pair. The elastic member is arranged between the first member and the second member. The dielectric member is arranged adjacently to the elastic member. The dielectric member changes a thickness of an air layer by an elastic deformation of the elastic member, the air layer being formed by the dielectric member being opposed to the first member in the first direction. The electrode pair forms a plurality of capacitances including a capacitance component changed in accordance with a change of the thickness of the air layer. The detection mechanism outputs a detection signal on a movement amount of the second member in the first direction based on a change of a combined capacitance of the electrode pair.

The display device is accommodated in the second member and has a display surface opposed to the first member.

According to the embodiments of the present application, even in a case where a change in distance between electrodes is minute, a large capacitance change can be generated. Accordingly, excellent detection sensitivity can be ensured.

These and other objects, features and advantages of the present application will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 8A is a cross-sectional view of a main part for explaining an action of a sensor apparatus according to a third embodiment, and FIG. 8B is an equivalent circuit diagram of an electrode pair constituting the sensor apparatus;

FIG. 9A is a cross-sectional view of a main part for explaining an action of the sensor apparatus according to the third embodiment, and FIG. 9B is an equivalent circuit diagram of the electrode pair constituting the sensor apparatus;

FIG. 11 are schematic cross-sectional views showing a sensor apparatus according to a fourth embodiment;

DETAILED DESCRIPTION

Embodiments of the present application will be described below in detail with reference to the drawings.

First Embodiment

[Overall Structure of Sensor Apparatus]

Figure 1:
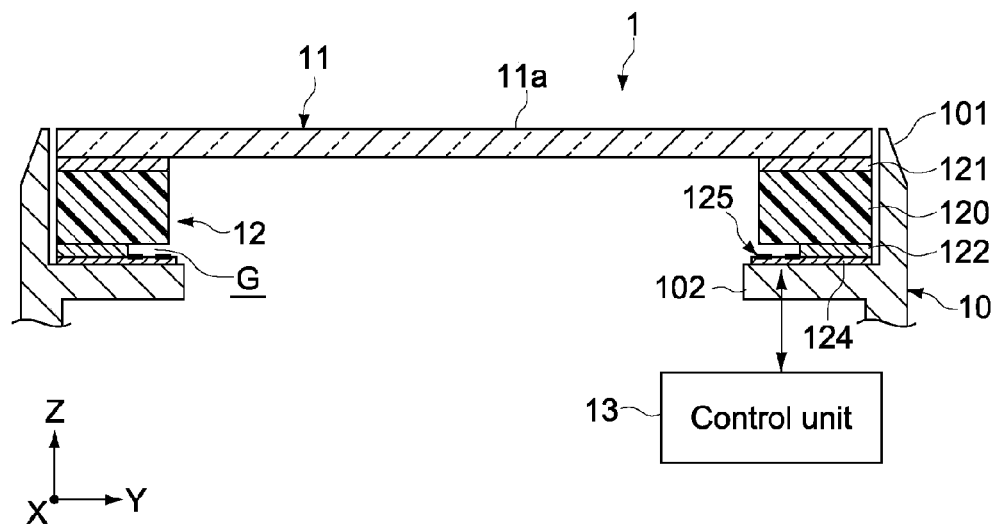
FIG. 1 is a schematic cross-sectional view showing a sensor apparatus according to a first embodiment.

FIG. 1 is a schematic cross-sectional view showing a sensor apparatus according to an embodiment. A sensor apparatus 1 of this embodiment is structured as a press detection sensor that detects a press input operation made by a user. Here, in FIG. 1, a Z-axis direction indicates a press input direction with respect to the sensor apparatus 1, and X- and Y-axis directions indicate biaxial directions that are perpendicular to the Z-axis direction and orthogonal to each other.

The sensor apparatus 1 includes a casing 10 (first member), an input member 11 (second member), a detection mechanism 12 that detects a press operation to the input member 11, and a control unit 13 that drives the detection mechanism 12.

The input member 11 has an input operation surface 11a for receiving a press operation made by a user, and is attached to the casing 10 with the input operation surface 11a facing the outside (upward in FIG. 1). On the input operation surface 11a, appropriate characters, figures, or the like for prompting a user to make a press operation may be formed. Examples of an operator used to press the input member 11 include part of a human body and an auxiliary tool, such as a finger of a user and a stylus pen.

The input member 11 is formed of a circular or polygonal plate-like member. The plate-like member may be a single-layer plate member or a laminated body of plate members. The input member 11 may be formed of a material having light-transmissive property, or a material having no light-transmissive property. Further, the plate-like member described above may be a sensor panel such as a touch panel. The input member 11 is formed of a touch panel, with the result that in addition to the press detection in the Z-axis direction, coordinates at a press position in an XY plane can be detected.

The casing 10 is formed of, for example, a plastic material having electrical insulation property. The casing 10 includes an annular first wall portion 101 and a second wall portion 102. The first wall portion 101 protrudes in the Z-axis direction so as to surround a circumference of the input member 11. The second wall portion 102 protrudes perpendicularly to the Z-axis direction from the first wall portion 101 toward the inside of the casing 10.

[Detection Mechanism]

The detection mechanism 12 is arranged between the casing 10 and the input member 11, and detects a relative movement amount of the input member 11 with respect to the casing 10. The detection mechanism 12 electrostatically detects a relative movement of the input member 11 with respect to the casing 10, and outputs a detection signal on a movement amount of the input member 11 in the Z-axis direction to the control unit 13. The control unit 13 includes a driver circuit that drives the detection mechanism 12 and a computing circuit that calculates the movement amount of the input member 11 based on the detection signal output from the detection mechanism 12.

The detection mechanism 12 includes an elastic member 120. The elastic member 120 is formed in an annular shape along the circumference of the input member 11, and arranged between a peripheral portion of the input member 11 and the second wall portion 102 of the casing 10. The input member 11 is elastically supported by the elastic member 120.

Figure 2:
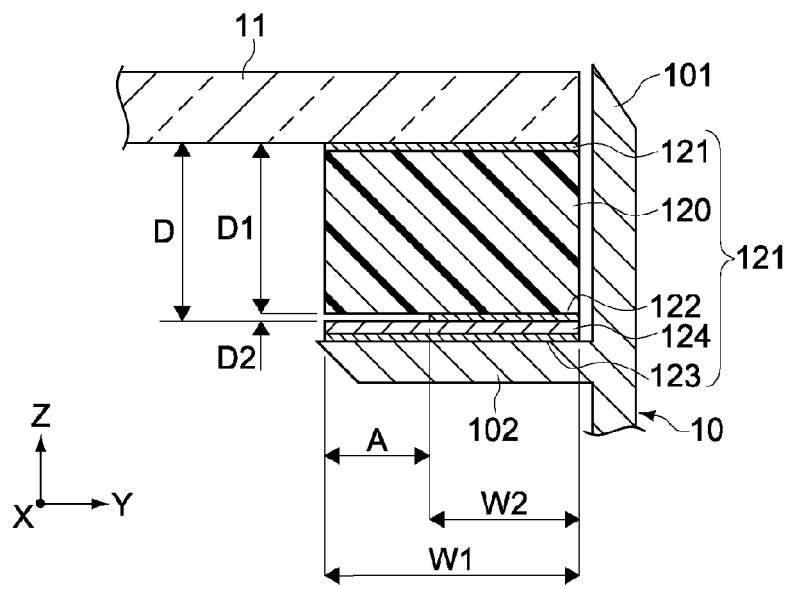
FIG. 2 is a cross-sectional view showing a basic structure of a main part of the sensor apparatus shown in FIG. 1.

FIG. 2 is a cross-sectional view of a main part schematically showing a basic structure of the detection mechanism 12. A first adhesion layer 121, the elastic member 120, a second adhesion layer 122, a dielectric layer 124, and a third adhesion layer 123 are laminated between the peripheral portion of the input member 11 and the second wall portion 102 of the casing 10. The adhesion layers 121 to 123 are each formed of a pressure-sensitive tape, a coating of an adhesive, or the like. The first adhesion layer 121 bonds the input member 11 and the elastic member 120 to each other, and the second adhesion layer 122 bonds the elastic member 120 and the dielectric layer 124 to each other. Further, the third adhesion layer 123 bonds the dielectric layer 124 and the second wall portion 102 of the casing 10 to each other.

As shown in FIG. 2, the first adhesion layer 121, the dielectric layer 124, and the third adhesion layer 123 are formed to have a width equal to or larger than a width (W1) of the elastic member 120, while the second adhesion layer 122 is formed to have a width (W2) smaller than the width W1. Accordingly, a gap G having a width A (W1−W2) is formed on an inner circumference side of the elastic member 120 and between the elastic member 120 and the dielectric layer 124. The gap G is an air layer and a thickness thereof (size in Z-axis direction) is determined by a thickness of the second adhesion layer 122 (D2=D−D1). Here, "D" represents a lamination thickness of the first adhesion layer 121, the second adhesion layer 122, and the elastic member 120, and "D1" represents a lamination thickness of the first adhesion layer 121 and the elastic member 120.

In the above structure, when the input member 11 is pressed to the casing 10 in the Z-axis direction, the elastic member 120 is compressed and deformed in the Z-axis direction. At this time, a lower surface area of the elastic member 120 that faces the gap G is elastically deformed so as to fill in the gap G, and accordingly a thickness of the gap G (D2) is reduced or disappears in accordance with the magnitude of a pressing force. The detection mechanism 12 includes an electrode pair 125 (FIG. 1) for electrostatically detecting a change in thickness of the gap G.

Figure 3A:
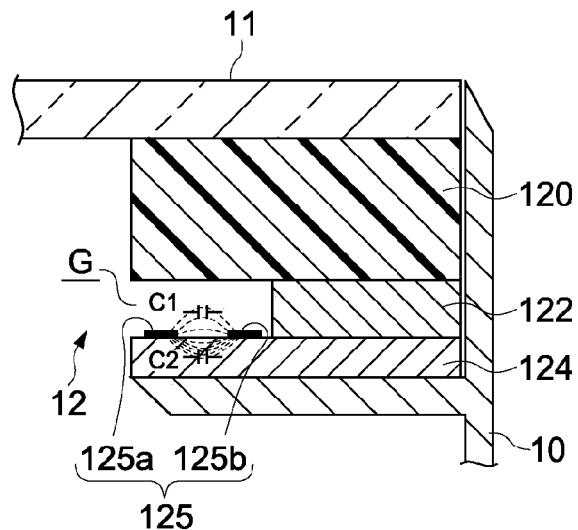
FIG. 3A is a cross-sectional view of a main part for explaining an action of the sensor apparatus of FIG. 1.

FIG. 3A is a cross-sectional view of a main part schematically showing a structural example of the electrode pair 125. For easy understanding of description, a relationship in thickness between the respective elements constituting the detection mechanism 12 is not taken into consideration in FIG. 3A, and the illustration of the first adhesion layer 121 and the third adhesion layer 123 is omitted (the same holds true for FIG. 4A, FIGS. 7A to 7C, FIG. 8A, FIG. 9A, and FIG. 11).

In this embodiment, the electrode pair 125 includes a first electrode portion 125a and a second electrode portion 125b, which are arranged on the dielectric layer 124 so as to face the air layer in the gap G. The first electrode portion 125a and the second electrode portion 125b are opposed to each other at a predetermined interval, and the first electrode portion 125a is arranged on the inner circumference side of the elastic member 120 more than the second electrode portion 125b. With this structure, the electrode pair 125 forms a first capacitance C1 between the first electrode portion 125a and the second electrode portion 125b that interpose the gap G, and forms a second capacitance C2 between the first electrode portion 125a and the second electrode portion 125b that interpose the dielectric layer 124.

Figure 3B:
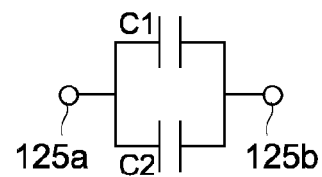
FIG. 3B is an equivalent circuit diagram of an electrode pair constituting the sensor apparatus.

FIG. 3B is an equivalent circuit of the electrode pair 125 shown in FIG. 3A. A capacitance of the electrode pair 125 corresponds to a combined capacitance of a capacitor forming the first capacitance C1 and a capacitor forming the second capacitance C2. The first capacitance C1 and the second capacitance C2 are defined by the following expressions.

$$C1 = \epsilon r1 \cdot \epsilon 0 \cdot S/d \quad (1)$$

$$C2 = \epsilon r2 \cdot \epsilon 0 \cdot S/d \quad (2)$$

Here, each of ∈r1 and ∈r2 represents a specific dielectric constant of a dielectric, ∈0 represents a dielectric constant of vacuum, S represents an opposing area between electrodes, and d represents an opposing distance between electrodes.

In the structural example shown in FIG. 3A, a dielectric forming the first capacitance C1 is air in the gap G (∈r1≈1), a dielectric forming the second capacitance C2 is a dielectric material (∈r2>1) constituting the dielectric layer 124. The first capacitance C1 and the second capacitance C2 have the same opposing area (S) and opposing distance (d) between the first electrode portion 125a and the second electrode portion 125b. The capacitor forming the first capacitance C1 and the capacitor forming the second capacitance C2 are connected to each other in a parallel relationship, and therefore a combined capacitance C of the electrode pair 125 is calculated by the following expression.

$$C = C1 + C2 \quad (3)$$

Figure 4A:
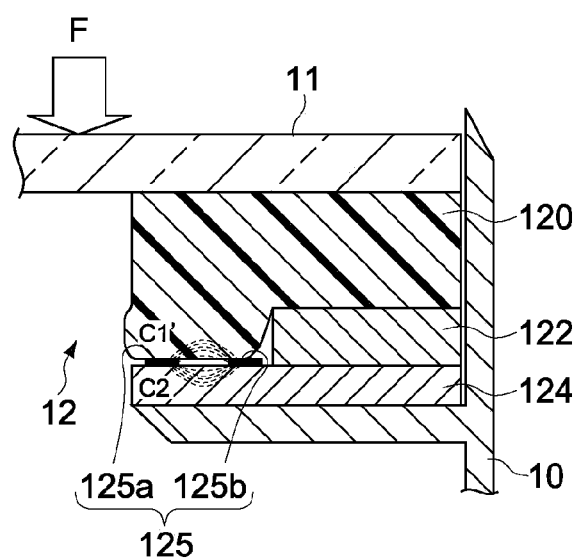
FIG. 4A is a cross-sectional view of a main part for explaining an action of the sensor apparatus of FIG. 1.
Figure 4B:
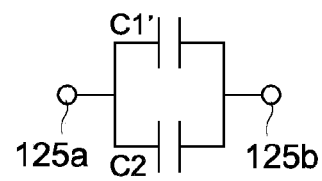
FIG. 4B is an equivalent circuit diagram of an electrode pair constituting the sensor apparatus.

FIG. 4A is a cross-sectional view of the detection mechanism 12, schematically showing a state where a pressing force F is applied to the input member 11 in the Z-axis direction. FIG. 4B is an equivalent circuit of the electrode pair 125 shown in FIG. 4A. When the input member 11 is pressed into the casing 10, the elastic member 120 is compressed and deformed and a part of the elastic member 120 enters the gap G. An entry amount of the elastic member 120 into the gap G is substantially proportional to a deformation amount of the elastic member 120, that is, a movement amount of the input member 11. FIG. 4A shows a state where the gap G disappears due to the entry of the elastic member 120 and the thickness of the air layer is 0. In this case, because the elastic member 120 having a specific dielectric constant (>1) larger than a specific dielectric constant (≈1) of the air intervenes between the first electrode portion 125a and the second electrode portion 125b, the first capacitance C1 is increased to a capacitance C1'. On the other hand, the second capacitance C2 is not changed because a specific dielectric constant between the first electrode portion 125a and the second electrode portion 125b does not fluctuate. As described above, when the input member 11 is pressed, a combined capacitance C of the electrode pair 125 is increased by an amount corresponding to (C1'−C1).

A change amount of the combined capacitance C of the electrode pair 125, which accompanies the movement of the input member 11, can be adjusted by the elastic modulus of the elastic member 120, the area and height (thickness) of the gap G, the structure of the electrode pair 125, and the like. For example, the width (A) of the gap G is determined as appropriate in consideration of an area necessary for forming the electrode pair 125. The width (W1) of the elastic member 120 is determined in consideration of the width (A) of the gap G and the width (W2) of the second adhesion layer 122 functioning as a support of the elastic member 120. The width W2 is a design parameter for determining the strength necessary for supporting the input member 11 and a deformation amount of the elastic member 120 due to a press.

A constituent material of the elastic member 120 is not limited particularly. For example, a rubber elastic body, an organic resin foam such as a polyurethane foam, or the like is used. The elastic modulus of the elastic member 120 has to be lower than that of the second adhesion layer 122, but the upper and lower limits thereof are not limited.

The thickness of the second adhesion layer 122 defines the thickness (D2) of the gap G in the initial state of the sensor apparatus 1, and therefore the thickness of the second adhesion layer 122 is determined while considering a change state of the combined capacitance (C) of the electrode pair 125, which is caused by the press operation to the input member 11.

A constituent material of the dielectric layer 124 is selected as appropriate in consideration of easiness for forming the electrode pair 125, adhesiveness with the second adhesion layer 122, and the like. The dielectric layer 124 is formed of, for example, a resin film such as a PET (polyethylene terephthalate) film. The thickness of the dielectric layer 124 is not particularly limited and is determined in consideration of the total thickness of the sensor apparatus 1 or detection mechanism 12, or the like. The dielectric constant of the dielectric layer 124 is not limited, but a smaller dielectric constant of the dielectric layer 124 is desirable. Thus, a change rate of the combined capacitance of the electrode pair 125 can be increased.

The first electrode portion 125a and the second electrode portion 125b constituting the electrode pair 125 are formed of conductor layers formed on the dielectric layer 124. The first and second electrode portions 125a and 125b may be a metal foil of aluminum or copper, or a conductive paste. The first and second electrode portions 125a and 125b are electrically connected to the control unit 13, and an arrangement interval therebetween or an input voltage is determined such that capacitive coupling therebetween is achieved. To electrically connect the first and second electrode portions 125a and 125b with the control unit 13, a wiring layer formed on the dielectric layer 124 may be used, or a wiring board provided independently of the dielectric layer 124 may be used.

[Control Unit]

The control unit 13 includes a driver circuit that generates a drive signal input to the electrode pair 125, and a computing circuit that processes a detection signal output from the electrode pair 125. In this embodiment, a capacitance between the first and second electrode portions 125a and 125b is detected by a detection system called mutual capacitance system.

Figure 5:
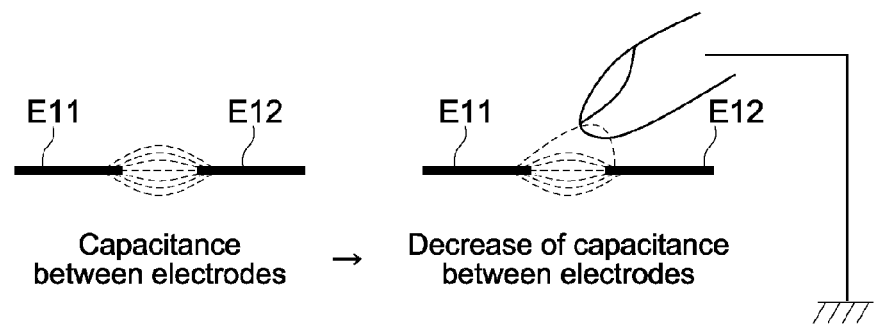
FIG. 5 is a diagram for explaining a capacitance detection method for a typical mutual capacitance system.

The mutual capacitance system, which is also referred to as a bipolar electrode system, includes two capacitively-coupled electrodes E11 and E12 as shown in FIG. 5, and a change in coupling capacitance thereof is detected. Generally, when a grounded object comes close to a capacitively-coupled area, the capacitance is reduced. Touch panels of a system in which the reduction in capacitance is detected to calculate a coordinate position of a finger or the like are put into practical use.

In this embodiment, one of the first and second electrode portions 125a and 125b as a pair is connected to the driver circuit, and the other is connected to the computing circuit. For the drive signal, a pulse signal of a predetermined frequency is used, though not limited thereto. An AC signal or DC signal including a high frequency may be used. By the input of the drive signal, both the first and second electrode portions 125a and 125b are electrostatically coupled and form the first and second capacitances C1 and C2. The control unit 13 of this embodiment that adopts the mutual capacitance system as the detection principle detects a change in capacitance of the electrode pair 125, which is changed in accordance with a deformation amount of the elastic member 120 when a press operation is made on the input member 11. As the elastic member 120 becomes closer to the electrode pair 125, the thickness of the gap G is reduced more, and a dielectric constant of the coupling area between the electrodes becomes closer to the dielectric constant of the elastic member 120. Thus, the first capacitance C1 is increased and the computing circuit calculates a movement amount of the input member 11 based on the change amount of the first capacitance C1. The control unit 13 generates a control signal based on the calculated movement amount of the input member 11. The control signal is supplied to a device that operates by receiving an output of the sensor apparatus 1.

[Operation of Sensor Apparatus]

Figure 6:
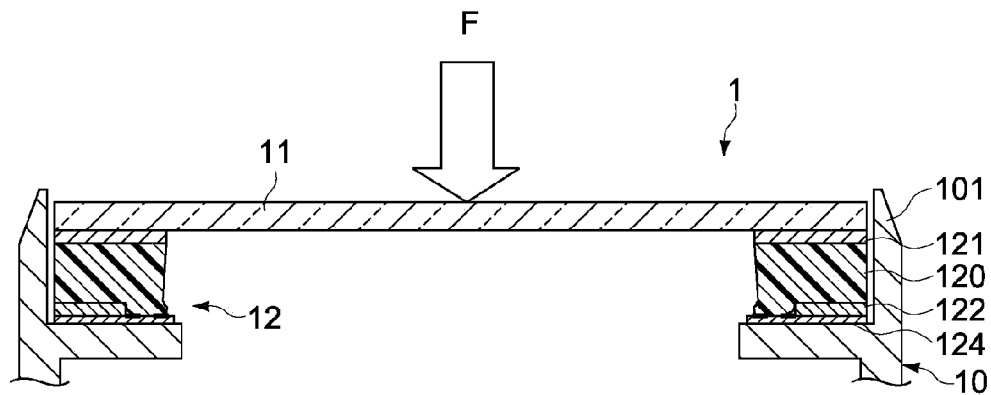
FIG. 6 is a schematic cross-sectional view showing an operating state of the sensor apparatus of FIG. 1.

In the sensor apparatus 1 of the above structure, when the center of the input member 11 is pressed as shown in FIG. 6, the elastic member 120 is subjected to substantially-uniform compressive deformation over the whole circumference thereof, and accordingly the thickness of the gap G is changed. The electrode pair 125 of the detection mechanism 12 outputs the change of a capacitance that is based on the change of the thickness of gap G as a detection signal. The control unit 13 judges a press operation of the input member 11 based on the detection signal and generates a predetermined control signal.

In the sensor apparatus 1 of this embodiment, the detection mechanism 12 outputs a change in dielectric constant of a dielectric formed between the electrode pair 125, as a detection signal on the movement amount of the input member 11 with respect to the casing 10. Thus, a capacitance change rate can be increased compared to a system of detecting a change in capacitance based on a distance between electrodes. Therefore, according to the sensor apparatus 1 of this embodiment, a large capacitance change can be generated even in a case where the movement amount of the input member 11 is minute, with the result that excellent detection sensitivity can be ensured.

For example, assuming that the thickness of the elastic member 120 is 0.5 mm, the specific dielectric constant of the elastic member 120 is 3, the thickness of the second adhesion layer 122 is 0.05 mm, and the specific dielectric constant of the dielectric layer 124 is 3, a capacitance change rate of the electrode pair 125 before and after a press operation is made is estimated.

The combined capacitance of the electrode pair 125 is, as represented in Expression (3), the sum of the first capacitance C1 on the gap G side and the second capacitance C2 on the dielectric layer 124 side. In principle, since the difference between the capacitances C1 and C2 resides in a difference in dielectric constant, the capacitance C2 becomes three times larger than the capacitance C1. Specifically, the following expression is obtained.

$$C = C1 + C2 = C1 + 3 \times C1 = 4C1 \quad (4)$$

Due to the press of the input member 11, the elastic member 120 protrudes into the gap G. When the air layer disappears, the dielectric constant of a dielectric layer on the gap G side is changed from 1 to 3, and therefore a value of the capacitance C1 becomes three times larger. Since the capacitance C2 on the dielectric layer 124 side is not changed, a combined capacitance of the electrode pair 125 after a press operation is made is as follows.

$$C' = 3 \times C1 + C2 = 3 \times C1 + 3 \times C1 = 6C1 \quad (5)$$

In other words, according to this embodiment, due to the press operation made on the input member 11, the combined capacitance of the electrode pair 125 is changed from 4C1 to 6C1, and a capacitance change rate becomes 50% (1.5 times larger). Since the thickness of the second adhesion layer 122 corresponds to 10% of the thickness of the elastic member 120, a capacitance change rate remains 10% in the system of detecting a change in capacitance based on a distance between electrodes. On the other hand, according to this embodiment, a substantially five-fold capacitance change can be obtained. As a matter of course, an estimation result of the capacitance change rate of the electrode pair 125 before and after a press operation is made differs depending on the specific dielectric constants of the elastic member 120 and the dielectric layer 124 and the thickness of the gap G.

As described above, according to this embodiment, even in a case where a movement amount of the input member 11 due to a press is minute, a press operation can be reliably detected based on a large capacitance change of the electrode pair 125. Further, since the capacitance of the electrode pair 125 is successively changed in accordance with a movement amount of the input member 11, a relative movement amount of the input member 11 with respect to the casing 10 can be detected accurately.

<Second Embodiment>

Figure 7A:
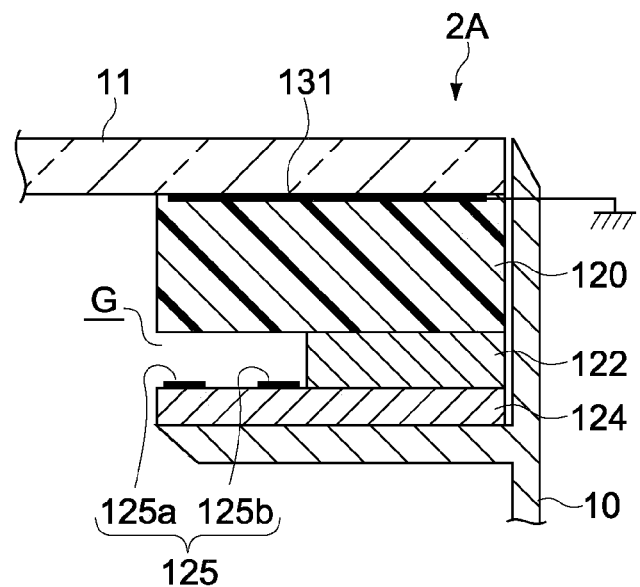
FIG. 7 are schematic cross-sectional views of a main part of a sensor apparatus according to a second embodiment.
Figure 7B:
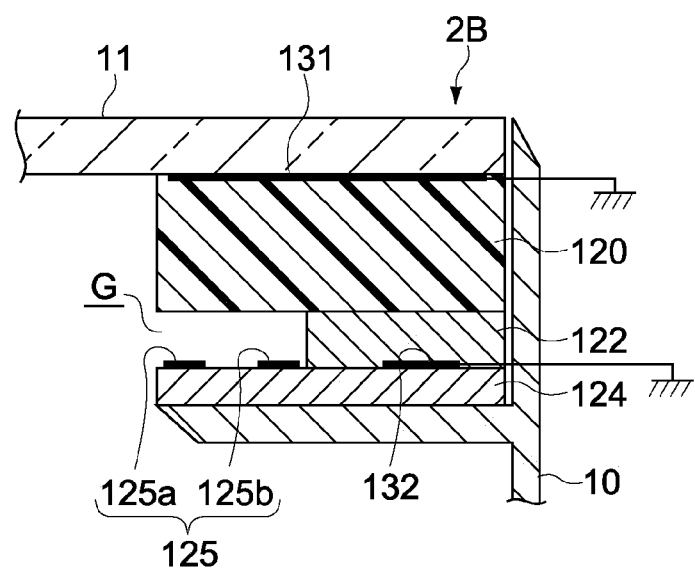

FIGS. 7A and 7B are cross-sectional views of a main part schematically showing a sensor apparatus according to a second embodiment. It should be noted that in the figures, components corresponding to those in the first embodiment described above are denoted by the same reference symbols and detailed description thereof will be omitted.

A sensor apparatus 2A shown in FIG. 7A includes a first shield electrode 131 (third electrode portion) arranged between the peripheral portion of the input member 11 and the elastic member 120. The first shield electrode 131 is connected to a ground potential and is opposed to the electrode pair 125 in the Z-axis direction, the electrode pair 125 facing the gap G and being formed on the dielectric layer 124. The first shield electrode 131 is formed of a metal foil of aluminum or copper, which is attached to the peripheral portion of the input member 11 or the upper surface of the elastic member 120.

In the sensor apparatus 2A with the structure described above, the first shield electrode 131 has a function of suppressing a capacitance change of the electrode pair 125 due to a finger or hand of the user coming close to the input member 11. Thus, a press operation made on the input member 11 can be detected with high accuracy and a press detection function with high reliability can be ensured.

Further, in the sensor apparatus 2A, any of the electrode portions may be connected to the computing circuit of the control unit 13. However, in a case where the computing circuit is connected to the first electrode portion 125a positioned on the inner circumference side, noises generated when a finger or hand comes close to the casing 10 can be prevented from entering the computing circuit.

On the other hand, a sensor apparatus 2B shown in FIG. 7B includes a second shield electrode 132, in addition to the first shield electrode 131. The second shield electrode 132 is connected to a ground potential and is arranged between the adhesion layer 122 (support) and the dielectric layer 124. The second shield electrode 132 is formed of a metal foil of aluminum or copper, which is attached to the lower surface of the adhesion layer 122 or the upper surface of the dielectric layer 124.

In the sensor apparatus 2B with the structure described above, the second shield electrode 132 is arranged on the dielectric layer 124 so that the second shield electrode 132 and the electrode pair 125 are positioned on the same plane, thus having a function of suppressing a capacitance change of the electrode pair 125 due to a finger or hand coming close to the casing 10. With such a structure, a press operation made on the input member 11 can be detected with high accuracy and a press detection function with high reliability can be ensured.

It should be noted that the first shield electrode 131 and the second shield electrode 132 are formed in the sensor apparatus 2B shown in FIG. 7B, but the first shield electrode 131 may be omitted as needed. In addition, in the sensor apparatus 2B, any of the first electrode portion 125a and the second electrode portion 125b may be connected to the computing circuit of the control unit 13.

<Third Embodiment>

FIG. 8A is a cross-sectional view of a main part schematically showing a sensor apparatus according to a third embodiment. It should be noted that in the figures, components corresponding to those in the first embodiment described above are denoted by the same reference symbols and detailed description thereof will be omitted.

A sensor apparatus 3 of this embodiment includes a detection mechanism 22 having an electrode pair 225 that forms a plurality of capacitances between the input member 11 and the casing 10. The electrode pair 225 includes a first electrode portion 225a and a second electrode portion 225b. The first electrode portion 225a is arranged on the dielectric layer 124 so as to face the air layer in the gap G. The second electrode portion 225b is arranged between the input member 11 and the elastic member 120. The first electrode portion 225a and the second electrode portion 225b are opposed to each other in the Z-axis direction. With this structure, the electrode pair 225 forms a first capacitance C1 between an interface P of the gap G (air layer) and the elastic member 120, and the first electrode portion 225a, and a second capacitance C2 between the interface P and the second electrode portion 225b.

FIG. 8B is an equivalent circuit of the electrode pair 225 shown in FIG. 8A. A capacitance of the electrode pair 225 corresponds to a combined capacitance of a capacitor forming the first capacitance C1 and a capacitor forming the second capacitance C2. The capacitor forming the first capacitance C1 and the capacitor forming the second capacitance C2 are connected to each other in series, and accordingly a combined capacitance C of the electrode pair 225 is calculated by the following expression.

$$(1/C) = (1/C1) + (1/C2)$$

Specifically, $C = (C1 \times C2)/(C1+C2)$ (6)

FIG. 9A is a cross-sectional view of the detection mechanism 22 schematically showing a state where a pressing force F is applied to the input member 11 in the Z-axis direction. FIG. 9B is an equivalent circuit of the electrode pair 225 shown in FIG. 9A. When the input member 11 is pressed into the casing 10, the elastic member 120 is compressed and deformed and a part of the elastic member 120 enters the gap G. An entry amount of the elastic member 120 into the gap G is substantially proportional to a deformation amount of the elastic member 120, that is, a movement amount of the input member 11. FIG. 9A shows a state where the gap G disappears due to the entry of the elastic member 120 and the thickness of the air layer is 0. In this case, because the elastic member 120 having a specific dielectric constant (>1) larger than a specific dielectric constant (≈1) of the air intervenes between the first electrode portion 225a and the second electrode portion 225b, the first capacitance C1 is increased to a capacitance C1'. On the other hand, the second capacitance C2 is increased to a capacitance C2' by the reduction in thickness of the elastic member 120. As described above, when the input member 11 is pressed, a combined capacitance C of the electrode pair 225 is increased by the increase of the capacitances C1 and C2.

The first and second electrode portions 225a and 225b constituting the electrode pair 225 may be a metal foil of aluminum or copper, or a conductive paste. The first and second electrode portions 225a and 225b are electrically connected to a control unit 23, and an arrangement interval therebetween or an input voltage is determined such that capacitive coupling therebetween is achieved.

The control unit 23 includes a driver circuit that generates a drive signal input to the electrode pair 225, and a computing circuit that processes a detection signal output from the electrode pair 225. In this embodiment, a capacitance between the first and second electrode portions 225a and 225b is detected by a detection system called self capacitance system.

Figure 10:
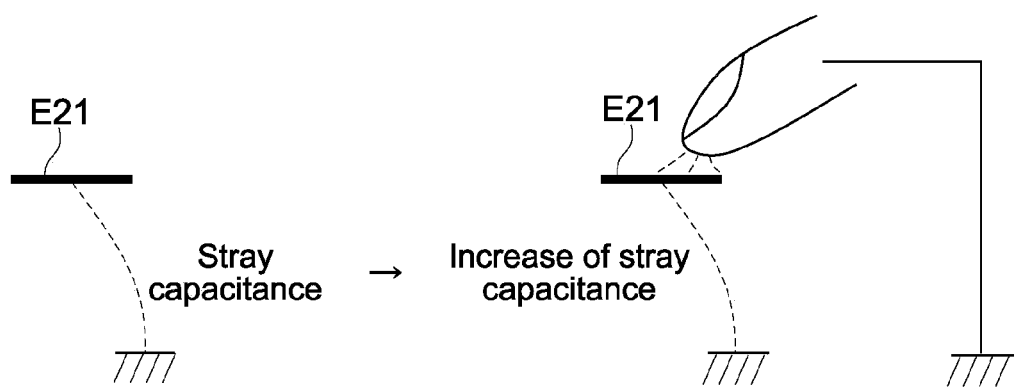
FIG. 10 is a diagram for explaining a capacitance detection method for a typical self capacitance system.

The self capacitance system, which is also referred to as a unipolar electrode system, uses one electrode for sensing. As shown in FIG. 10, an electrode E21 for sensing has a stray capacitance with respect to the ground potential. When a grounded object comes close to the electrode E21, the stray capacitance of the electrode E21 increases. Touch panels of a system in which the increase in capacitance is detected to calculate a coordinate position of a finger or the like are put into practical use.

In this embodiment, the first electrode portion 225a of the pair of first and second electrode portions 225a and 225b is connected to the control unit 23 as a sensing electrode. For the drive signal, a pulse signal of a predetermined frequency is used, though not limited thereto. An AC signal or DC signal including a high frequency may be used. By the input of the drive signal, both the first and second electrode portions 225a and 225b are electrostatically coupled and form the first and second capacitances C1 and C2 described above. The control unit 23 of this embodiment that adopts the self capacitance system as the detection principle detects a change in capacitance of the electrode pair 225, which is changed in accordance with a deformation amount of the elastic member 120 when a press operation is made on the input member 11. As the elastic member 120 becomes closer to the first electrode portion 225a, the thickness of the gap G is reduced more, and a distance between the first electrode portion 225a and the interface P is shortened. Then, by an additional press operation, the elastic member 120 that has entered the gap G is subjected to compressive deformation between the input member 11 and the dielectric layer 124, with the result that a distance between the second electrode portion 225b and the interface P is shortened. Thus, the first capacitance C1 and the second capacitance C2 are respectively increased and the computing circuit calculates a movement amount of the input member 11 based on the change amounts of the first and second capacitances C1 and C2. The control unit 13 generates a control signal based on the calculated movement amount of the input member 11. The control signal is supplied to a device that operates by receiving an output of the sensor apparatus 1.

In the sensor apparatus 3 of this embodiment, the detection mechanism 22 outputs a change in dielectric constant of a dielectric formed between the electrode pair 225, as a detection signal on the movement amount of the input member 11 with respect to the casing 10. Thus, a capacitance change rate can be increased compared to a system of detecting a change in capacitance based on a distance between electrodes. Therefore, according to the sensor apparatus 3 of this embodiment, a large capacitance change can be generated even in a case where the movement amount of the input member 11 is minute, with the result that excellent detection sensitivity can be ensured.

For example, assuming that an opposing area between electrodes is 10 mm$^2$, a thickness of an elastic body interposed between the electrodes is 0.5 mm, and a dielectric constant thereof is 3, a capacitance C0 between the electrodes is calculated as C0=0.53124 pF when a dielectric constant of vacuum is set to 8.85×10-$^{12}$ [F/m]. In this case, when the elastic body is compressed and deformed by 10% of the thickness, a capacitance C0' between the electrodes at this time is calculated as C0'=0.59027 pF, and a capacitance change amount (C0'–C0) is obtained as 0.05903 pF. In other words, in a known capacitance detection system based on the change of a distance between electrodes, a capacitance change rate is increased by about 10% in the above example.

On the other hand, in the sensor apparatus 3 of this embodiment, assuming that an opposing area between the first and second electrode portions 225a and 225b is 10 mm$^2$, a thickness of the elastic member 120 is 0.5 mm, a dielectric constant is 3, and the thickness of the gap G is 0.05 mm, a combined capacitance of the electrode pair 225 when a press operation is not made is calculated as C=0.408646 pF. Then, assuming that the elastic member 120 protrudes into the gap G by a press operation, a capacitance at this time is calculated as C'=0.482945 pF. A capacitance change amount (C'–C) at this time is obtained as 0.0743 pF, which is larger than the initial capacitance by about 18%.

Comparing the above examples, the deformation amount of the elastic body in the press direction is 0.05 mm in both the cases. However, a capacitance change rate twice as large as that of the known system can be obtained according to this embodiment.

As described above, according to this embodiment, even in a case where a movement amount of the input member 11 due to a press is minute, a press operation can be reliably detected based on a large capacitance change of the electrode pair 225. Further, since the capacitance of the electrode pair 225 is successively changed in accordance with a movement amount of the input member 11, a relative movement amount of the input member 11 with respect to the casing 10 can be detected accurately.

<Fourth Embodiment>

FIGS. 11A to 11C are cross-sectional views of a main part schematically showing a sensor apparatus according to a fourth embodiment. It should be noted that in the figures, components corresponding to those in the third embodiment described above are denoted by the same reference symbols and detailed description thereof will be omitted.

A sensor apparatus 4A shown in FIG. 11A includes first and second electrode portions 225a and 225b constituting an electrode pair 225, and the second electrode portion 225b is connected to a ground potential. With this structure, the second electrode portion 225b has a function of suppressing a capacitance change of the electrode pair 225 due to a finger or hand of the user coming close to the input member 11. Thus, a press operation made on the input member 11 can be detected with high accuracy and a press detection function with high reliability can be ensured.

A sensor apparatus 4B shown in FIG. 11B further includes a first shield electrode 231. The first shield electrode 231 is connected to a ground potential and is arranged between the adhesion layer 122 (support) and the dielectric layer 124. The first shield electrode 231 is formed of a metal foil of aluminum or copper, which is attached to the lower surface of the adhesion layer 122 or the upper surface of the dielectric layer 124.

In the sensor apparatus 4B with the structure described above, the first shield electrode 231 is arranged on the dielectric layer 124 so that the first shield electrode 231 and the first electrode portion 225a are positioned on the same plane, thus having a function of suppressing a capacitance change of the electrode pair 225 due to a finger or hand coming close to the casing 10. With such a structure, a press operation made on the input member 11 can also be detected with high accuracy and a press detection function with high reliability can be ensured.

A sensor apparatus 4C shown in FIG. 11C further includes a second shield electrode 232. The second shield electrode 232 is connected to a ground potential, and is formed on the dielectric layer 124 adjacently to the first electrode portion 225a. The second shield electrode 232 is formed on the inner circumference side more than the first electrode portion 225a, and accordingly has a function of suppressing electromagnetic noise that enters the first electrode portion 225a from the inside of the casing 10. With this structure, a press operation made on the input member 11 can be detected with higher accuracy.

<Fifth Embodiment>

Figure 12A:
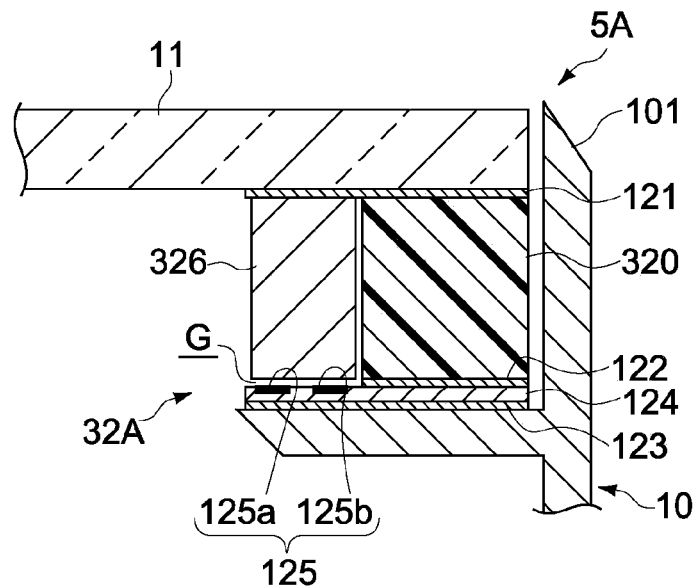
FIG. 12 are schematic cross-sectional views showing a sensor apparatus according to a fifth embodiment.
Figure 12B:
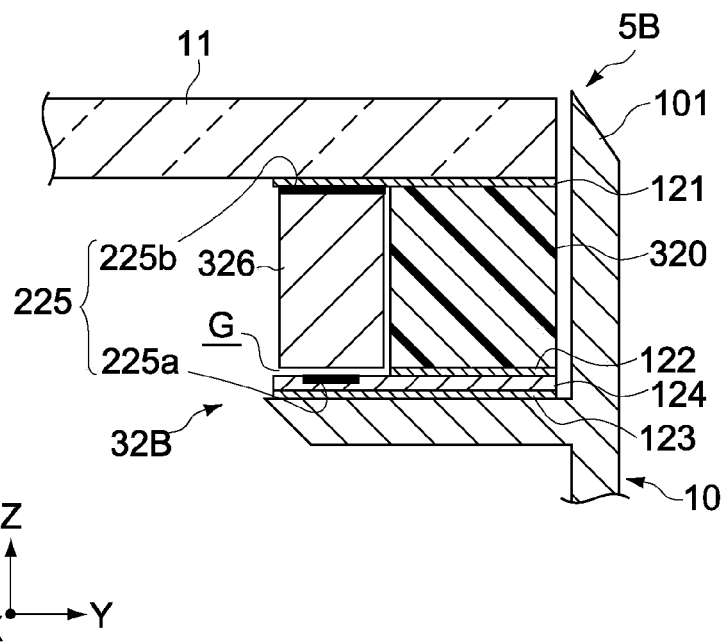

FIGS. 12A and 12B are cross-sectional views of a main part schematically showing a sensor apparatus according to a fifth embodiment. It should be noted that in the figures, components corresponding to those in the first and second embodiments described above are denoted by the same reference symbols and detailed description thereof will be omitted.

A sensor apparatus 5A shown in FIG. 12A includes a detection mechanism 32A including an elastic member 320 and a dielectric member 326. The elastic member 320 elastically supports the input member 11. The dielectric member 326 is arranged adjacently to the elastic member 320.

The elastic member 320 is arranged between the input member 11 and the dielectric layer 124 on the casing 10. The elastic member 320 is bonded to the peripheral portion of the input member 11 via an adhesion layer 121 having a width larger than that of the elastic member 320. Further, the elastic member 320 is bonded to the dielectric layer 124 via an adhesion layer 122 having the same width as that of the elastic member 320.

The dielectric member 326 has the same thickness as that of the elastic member 320. The dielectric member 326 is bonded to the input member 11 via the adhesion layers 121. Further, the lower surface of the dielectric member 326 is opposed to the dielectric layer 124 via the gap G having a thickness equal to that of the adhesion layer 122. The dielectric member 326 changes the thickness of the gap G by an elastic deformation of the elastic member 320. A constituent element of the dielectric member 326 is not particularly limited, and resin, rubber, ceramics material, or the like can be used therefor.

On the dielectric layer 124, an electrode pair 125 constituted of first and second electrode portions 125a and 125b is formed so as to be opposed to the lower surface of the dielectric member 326 via the gap G. The electrode pair 125 forms a plurality of capacitances including a capacitance component that is changed in accordance with the thickness of the gap G (the capacitances corresponding to the capacitances C1 and C2 shown in FIG. 3), and outputs a detection signal on a movement amount of the input member 11 in the Z-axis direction based on the change in a combined capacitance of the capacitances.

A sensor apparatus 5B shown in FIG. 12B is different from the sensor apparatus 5A in the structure of the detection mechanism. In other words, a detection mechanism 32B of the sensor apparatus 5B includes an electrode pair 225 constituted of a first electrode portion 225a and a second electrode portion 225b. The first electrode portion 225a is arranged on the dielectric layer 124 to face the gap G. The second electrode portion 225b is arranged between the input member 11 and the dielectric member 326. The electrode pair 225 forms a plurality of capacitances including a capacitance component that is changed in accordance with the thickness of the gap G (the capacitances corresponding to the capacitances C1 and C2 shown in FIG. 8), and outputs a detection signal on a movement amount of the input member 11 in the Z-axis direction based on the change in a combined capacitance of the capacitances.

In the sensor apparatuses 5A and 5B, along with a relative movement of the input member 11 with respect to the casing 10, the elastic member 320 is elastically deformed and thus the thickness of the gap G is changed. On the other hand, each of the electrode pairs 125 and 225 forms a plurality of capacitances including a capacitance component that is changed in accordance with a change of the thickness of the gap G. The change in the thickness of the gap G corresponds to a change in a dielectric constant of a dielectric (air layer, dielectric member 326, or mixture of air layer and dielectric member 326) interposed between the electrode pair 125 or 225, and the capacitance component includes a change in a dielectric of the dielectric constant. Accordingly, the detection mechanisms 32A and 32B each output a change of the dielectric constant of the dielectric formed between the electrode pairs 125 and 225, respectively, as a detection signal on a movement amount of the input member 11 with respect to the casing 10. Accordingly, according to the sensor apparatuses 5A and 5B of this embodiment, the operational effect that is the same as that of the first embodiment and third embodiment described above can be obtained.

Further, according to this embodiment, since the entry of the elastic member into the gap G at a time of a press operation does not involve a capacitance change, an area where the electrode pair 125 or the electrode portion 225a is to be formed can be reduced. For example, in the structural example of FIG. 12A, assuming that an electrode width of the first and second electrode portions 125a and 125b is 50 μm, an electrode interval is 50 μm, a distance from the electrode portion 125a to the inner peripheral portion of the dielectric layer 124 is 50 μm, and a distance from the electrode portion 125b to the adhesion layer 122 is 50 μm, the width of the gap G (corresponding to a dimension A of FIG. 2) can be set to 200 μm (50 μm×2+50 μm+50 μm).

<Sixth Embodiment>

Figure 13:
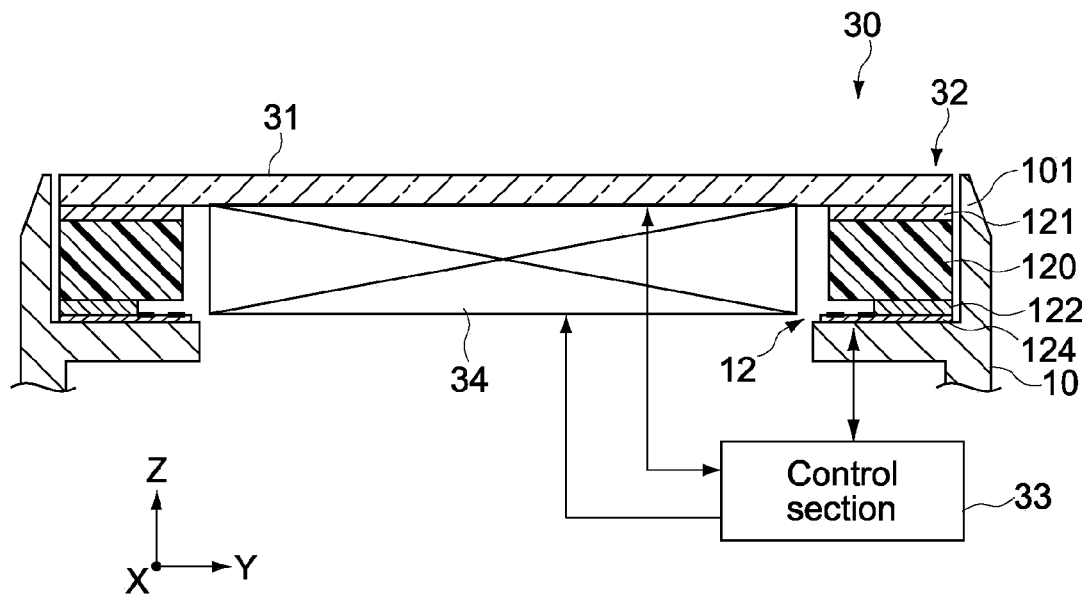
FIG. 13 is a schematic cross-sectional view showing a display apparatus according to a sixth embodiment.
Figure 14:
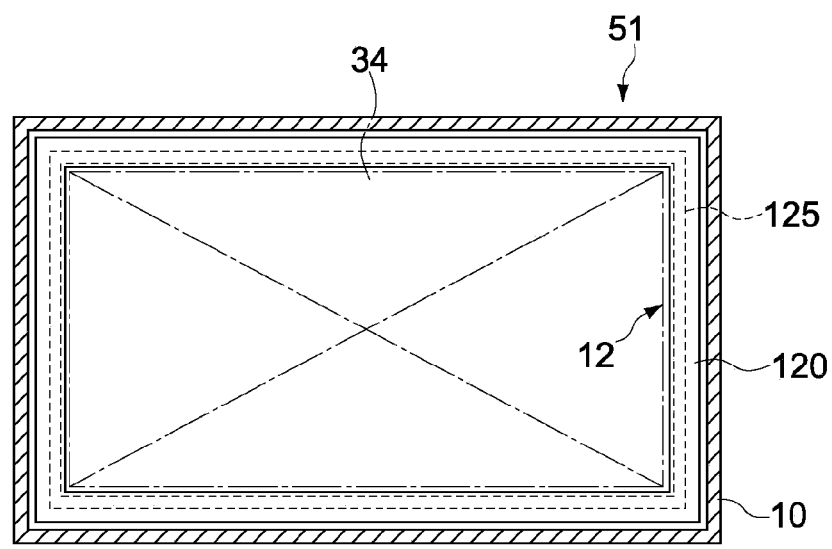
FIG. 14 is a schematic plan view showing an internal structure of the display apparatus shown in FIG. 13.

Subsequently, a sixth embodiment is shown. FIG. 13 is a schematic cross-sectional view of a display apparatus according to an embodiment, and FIG. 14 is a plan view showing an internal structure thereof. A display apparatus 51 of this embodiment includes a sensor section 32, a control section 33, and a display 34. The sensor section 32 has the structure that is the same as that of the sensor apparatus 1 described in the first embodiment, and an input member 31 on which a press operation is made by a user is constituted of a touch panel.

The touch panel 31 includes, for example, a plurality of transparent electrodes that are parallel in an X direction and a Y direction and a transparent base member that supports those transparent electrodes, and generates a detection signal corresponding to a press operation position of the user within an XY plane. The touch panel 31 is driven by the control section 33 and outputs the detection signal to the control section 33. The control section 33 specifies input position coordinates based on the detection signal.

The display 34 is accommodated in the casing 10. The display 34 is constituted of a display device such as a liquid crystal display device or an organic electroluminescence device, and is integrally bonded to the touch panel 31 on the inner surface side (lower surface side in FIG. 13) of the touch panel 31. The display 34 displays an image switched by a predetermined operation or an image (icon) selected by the user on an input operation surface of the touch panel 31. A display image of the display 34 is controlled by the control section 33. The display 34 is arranged inside an annular elastic member 120 of the sensor section 32 as shown in FIG. 14.

The sensor section 32 includes a detection mechanism 12 that detects a press operation made by a user on the touch panel 31, and outputs a detection signal thereof to the control section 33. The control section 33 drives the sensor section 32 and controls a display image of the display 34 based on the detection signal from the sensor section 32 or generates a predetermined control signal. The structure and action of the sensor section 32 are the same as those in the first embodiment described above, so description thereof is omitted here.

In the display apparatus 51 of this embodiment structured as described above, the coordinates of a position operated by a user and a press made on the touch panel 31 can be detected. In addition, a press operation can be detected with high sensitivity without a large movement amount of the touch panel 31 at a time when a press is detected.

Heretofore, although the embodiments of the present application have been described, the present application is not limited thereto and can be variously modified based on a technical idea of the present application.

For example, in the above embodiments, the electrode pair constituting the detection mechanism of the sensor apparatus is formed into an annular shape along the annular elastic member 120, but the present application is not limited thereto. The electrode pair may be divided along the circumference of the elastic member 120 as shown in FIGS. 15A and 15B.

Figure 15A:
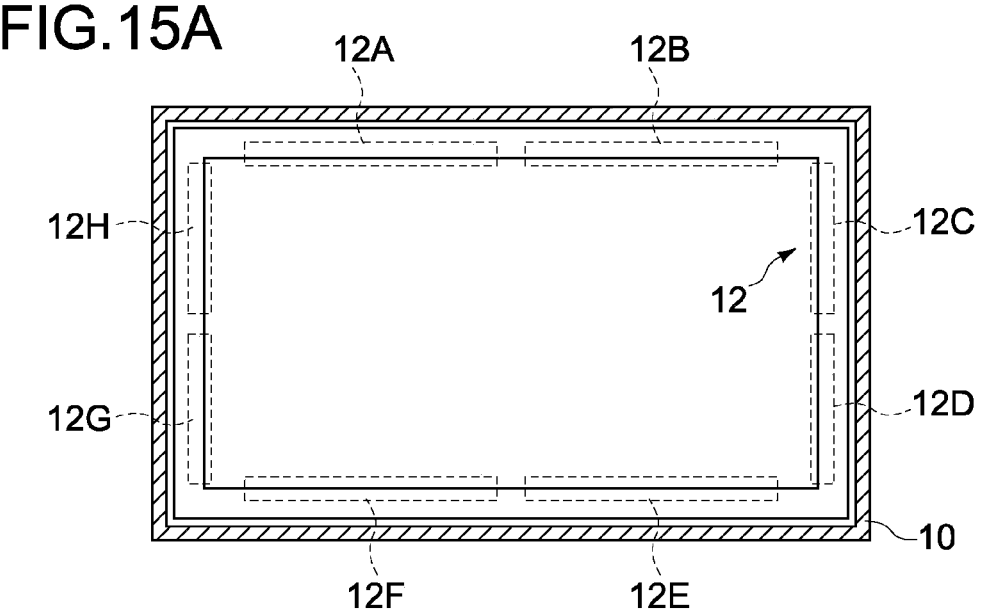
FIG. 15A is a schematic plan view showing a modified example of the structure of the sensor apparatus shown in FIG. 1.
Figure 15B:
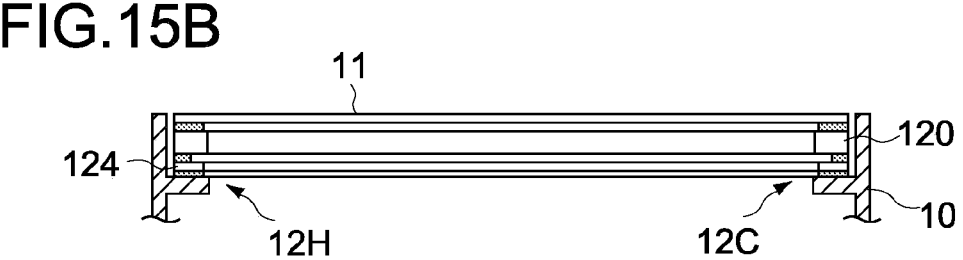
FIG. 15B is a cross-sectional view thereof.

FIGS. 15A and 15B are a schematic plan view and a schematic cross-sectional view of a sensor apparatus showing an example in which the detection mechanism 12 is divided into a plurality of detection mechanism portions 12A, 12B, 12C, 12D, 12E, 12F, 12G, and 12H. The electrode pair is formed independently for each of the detection mechanism portions 12A to 12H. According to the sensor apparatus, a press operation can be detected based on an additional value or average value of detection signals of the respective detection mechanism portions 12A to 12H. Further, since the respective detection mechanism portions 12A to 12H output different detection signals in accordance with a press position to the input member 11, a press position can also be detected in addition to a press.

Figure 16A:
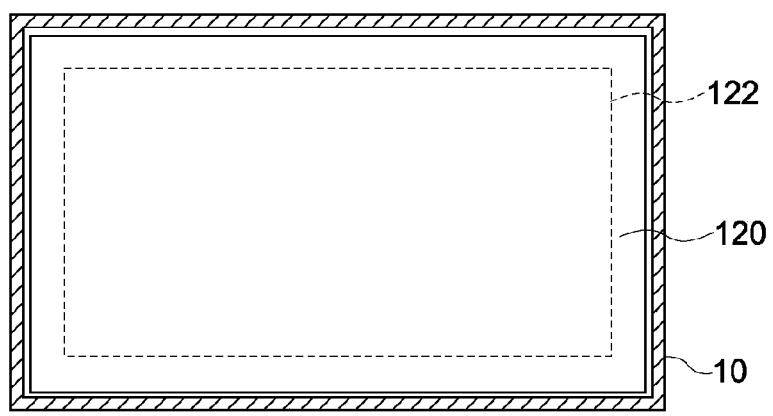
FIG. 16A is a schematic plan view showing a modified example of the structure of the display apparatus.
Figure 16B:
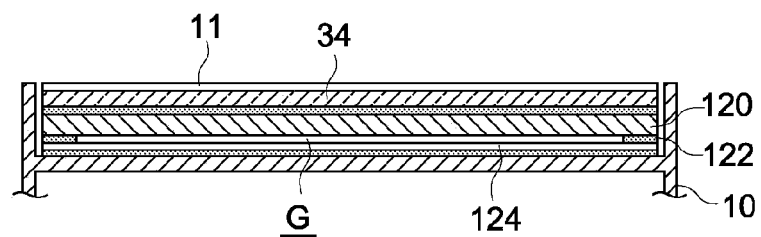
FIG. 16B is a cross-sectional view thereof.

Further, in the above embodiments, the elastic member 120 and the dielectric layer 124 that constituting the detection mechanism of the sensor apparatus are each formed into an annular shape. Instead, as shown in FIGS. 16A and 16B, the elastic member 120 and the dielectric layer 124 may be formed into a sheet-like shape. In this case, the gap G formed between the elastic member 120 and the dielectric layer 124 is formed over the inner circumference side of the annular adhesion layer 122 (support), and the electrode pair for detecting a capacitance is arranged so as to face the gap G.

With this structure, a capacitance change that is based on the entry of the elastic member 120 into the gap G is detected, with the result that a press operation made on the input member 11 can be detected.

Further, in the sensor apparatus shown in FIG. 16, a detection mechanism can be arranged in a press operation area of the input member 11, with the result that the degree of freedom on arrangement of the electrode pair can be enhanced. Further, in a case where the sensor apparatus is applied to a display apparatus, as shown in FIG. 16B, the display 34 can be arranged between the input member (or touch panel) 11 and the elastic member 120.

Figure 17:
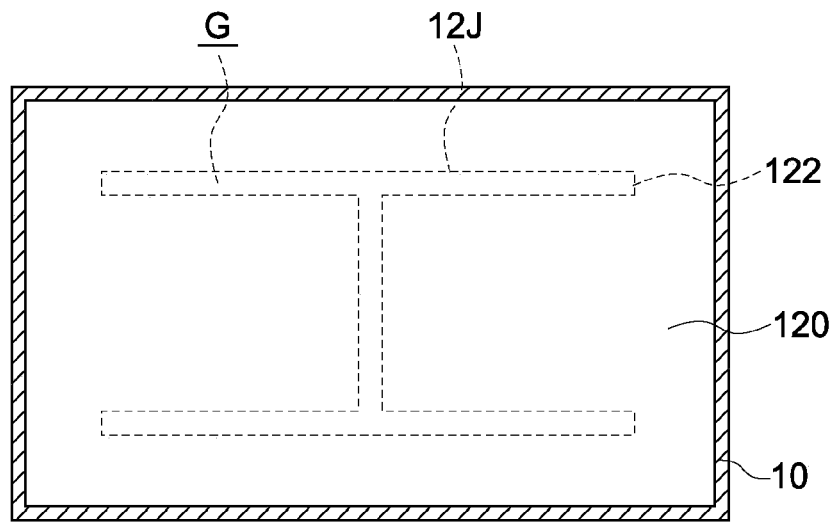
FIG. 17 is a schematic plan view showing another modified example of the structure of the display apparatus.

Further, as shown in FIG. 17, it is also possible to form a predetermined-shape pattern in the adhesion layer 122 (support) that supports the sheet-like elastic member 120 and thus arbitrarily set the shape of the gap G. In this case, an electrode pair for detecting a capacitance change is arranged on an area where the gap G is formed, thus forming a detection mechanism 12J that detects a press operation of the input member. The gap G is formed into an arbitrary shape, with the result that the degree of freedom on arrangement of the electrode pair can be enhanced and a detection mechanism can be selectively formed in an area in which a press operation is necessary to be made.

Figure 18:
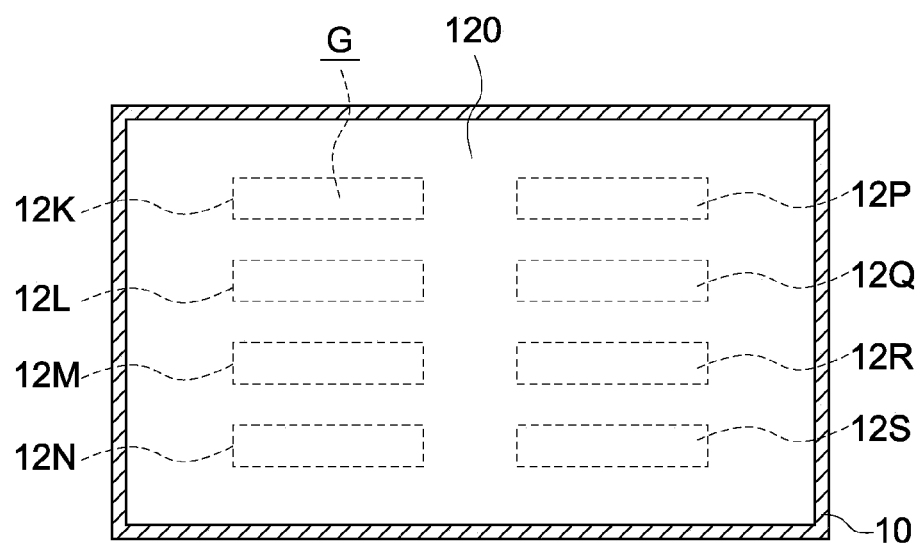
FIG. 18 is a schematic plan view showing another modified example of the structure of the display apparatus.

Similarly, FIG. 18 shows an example in which a plurality of gaps G are formed in the adhesion layer 122 (support) that supports the sheet-like elastic member 120, and detection mechanism portions 12K, 12L, 12M, 12N, 12P, 12Q, 12R, and 12S are provided thereto. In the case of this example, since the detection mechanism portions are independently formed in an input operation area, a press position can be detected in addition to a press operation.

Further, in the above sixth embodiment, the display apparatus 51 in which the sensor apparatus 1 shown in FIG. 1 is used as the sensor section 32 has been described as an example, but the structure of the sensor section 32 is not limited to the above example. The sensor apparatuses described in the second to fifth embodiments may be used.

Furthermore, in the above embodiments, the sensor apparatus that detects a press operation made by a user on the input member has been described as an example, but the present application is not limited thereto. For example, the present application can be applied to a sensor apparatus that detects an external pressure such as an atmospheric pressure or water pressure.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A capacitive sensor apparatus, comprising:
a first member;
a second member relatively movable in a first direction with respect to the first member; and
a detection mechanism including
(i) an elastic member arranged between the first member and the second member,
(ii) a support that is provided between the first member and the elastic member and forms an air layer between the first member and the elastic member, the air layer having a thickness changed by an elastic deformation of the elastic member, and the elastic member having a dielectric constant greater than a dielectric constant of the air layer, and
(iii) an electrode pair that is disposed on a single layer and that forms a first capacitance component that interposes a portion of a dielectric layer that supports the electrode pair and a second capacitance component, substantially parallel to the first capacitance component and formed between the electrode pair, the second capacitance component increases in accordance with the elastic deformation of the elastic member toward the first member which causes a decrease of the thickness of the air layer therebetween and which causes a change in dielectric constant of the second capacitance component, the detection mechanism being configured to output a detection signal on a movement amount of the second member in the first direction based on a change of a combined capacitance of the first and second capacitance components to detect input operation,
wherein the detection mechanism outputs the change of the dielectric constant as the detection signal.

2. The sensor apparatus according to claim 1, wherein
the first member includes the dielectric layer formed to face the air layer,
the electrode pair includes a first electrode portion and a second electrode portion that are arranged on the dielectric layer to face the air layer and are opposed to each other in a direction orthogonal to the first direction, and
the detection mechanism outputs the detection signal based on a change of the combined capacitance of the first capacitance component between the first electrode portion and the second electrode portion interposing the air layer, and the second capacitance component between the first electrode portion and the second electrode portion interposing the dielectric layer.

3. The sensor apparatus according to claim 2, further comprising a third electrode portion that is connected to a ground potential and arranged on the second member to be opposed to the electrode pair in the first direction.

4. The sensor apparatus according to claim 1, wherein
the support is a pressure-sensitive layer that bonds the elastic member to the first member.

5. The sensor apparatus according to claim 1, further comprising a computing section configured to be electrically connected to the detection mechanism and compute the movement amount of the second member in the first direction based on the detection signal.

6. The sensor apparatus according to claim 1, wherein
the second member is a touch panel that detects a position of an operator on a plane orthogonal to the first direction, and
the first member is a casing to accommodate the touch panel.

7. A capacitive sensor apparatus, comprising:
a first member;
a second member relatively movable in a first direction with respect to the first member; and
a detection mechanism including
(i) an elastic member arranged between the first member and the second member,
(ii) a dielectric member that is arranged adjacently to the elastic member and changes a thickness of an air layer by an elastic deformation of the elastic member, the air layer being formed by the dielectric member being opposed to the first member in the first direction, and the elastic member having a dielectric constant greater than a dielectric constant of the air layer, and
(iii) an electrode pair that is disposed on a single layer and that forms a first capacitance component that interposes a portion of the dielectric layer that supports the electrode pair and a second capacitance component formed between the electrode pair, the second capacitance component increases in accordance with the elastic deformation of the elastic member toward the first member which causes a decrease of the thickness of the air layer therebetween and which causes a change in dielectric constant of the second capacitance component, the detection mechanism being configured to output a detection signal on a movement amount of the second member in the first direction based on a change of a combined capacitance of the first and second capacitance components to detect input operation, wherein the detection mechanism outputs the change of the dielectric constant as the detection signal.

8. A display apparatus, comprising:

a first member;

a second member, having light-transmissive property, relatively movable in a first direction with respect to the first member;

a capacitive detection mechanism including (i) an elastic member arranged between the first member and the second member, (ii) a support that is provided between the first member and the elastic member and forms an air layer between the first member and the elastic member, the air layer having a thickness changed by an elastic deformation of the elastic member, and the elastic member having a dielectric constant greater than a dielectric constant of the air layer, and (iii) an electrode pair that is disposed on a single layer and that forms a first capacitance component that interposes a portion of a dielectric layer that supports the electrode pair and a second capacitance component formed between the electrode pair, the second capacitance component increases in accordance with the elastic deformation of the elastic member toward the first member which causes a decrease of the thickness of the air layer therebetween and which causes a change in dielectric constant of the second capacitance component, the detection mechanism being configured to output a detection signal on a movement amount of the second member in the first direction based on a change of a combined capacitance of the first and second capacitance components to detect input operation; and a display device that is accommodated in the second member and has a display surface opposed to the first member, wherein the detection mechanism outputs the change of the dielectric constant as the detection signal.

9. A display apparatus, comprising:

a first member;

a second member, having light-transmissive property, relatively movable in a first direction with respect to the first member;

a capacitive detection mechanism including (i) an elastic member arranged between the first member and the second member, (ii) a dielectric member that is arranged adjacently to the elastic member and changes a thickness of an air layer by an elastic deformation of the elastic member, the air layer being formed by the dielectric member being opposed to the first member in the first direction, and the elastic member having a dielectric constant greater than a dielectric constant of the air layer, and (iii) an electrode pair that is disposed on a single layer and that forms a first capacitance component that interposes a portion of a dielectric layer that supports the electrode pair and a second capacitance component formed between the electrode pair, the second capacitance component increases in accordance with the elastic deformation of the elastic member toward the first member which causes a decrease of the thickness of the air layer therebetween and which causes a change in dielectric constant of the second capacitance component, the detection mechanism being configured to output a detection signal on a movement amount of the second member in the first direction based on a change of a combined capacitance of the first and second capacitance components to detect input operation; and a display device that is accommodated in the second member and has a display surface opposed to the first member, wherein the detection mechanism outputs the change of the dielectric constant as the detection signal.

* * * * *